C. A. RICH.
POWER TRANSMITTING MECHANISM.
APPLICATION FILED DEC. 22, 1906.

997,700.

Patented July 11, 1911.
5 SHEETS—SHEET 4.

Fig. 4.

WITNESSES.
J. H. Thurston
C. G. Bradley

INVENTOR.
Charles A. Rich,
By Wilmarth H. Thurston,
Attorney

UNITED STATES PATENT OFFICE.

CHARLES A. RICH, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

POWER-TRANSMITTING MECHANISM.

997,700.  Specification of Letters Patent.  Patented July 11, 1911.

Application filed December 22, 1906. Serial No. 349,092.

*To all whom it may concern:*

Be it known that I, CHARLES A. RICH, of Providence, county of Providence, and State of Rhode Island, have invented certain new and useful Improvements in Power-Transmitting Mechanism; and I do hereby declare the following specification, taken in connection with the accompanying drawings, forming a part of the same, to be a full, clear, and exact description thereof.

In automatic screw machines it is desirable to provide means for automatically giving to the work-spindle one or the other of two different speeds, according to the character of the operation to be performed. Thus in cutting the thread by means of dies the work-spindle requires to be revolved at a comparatively slow speed, while in turning down the rod of stock the work-spindle may be rotated at a much higher speed, and much time may be saved when provision is made for automatically changing the speed of the spindle from one speed to the other. It is also desirable to provide means for automatically reversing the direction of rotation of the work-spindle, as for instance in running off the die.

One object of the present invention is to provide means for giving to the work-spindle two different speeds, and for automatically changing from one speed to the other, as the character of the operation to be performed makes desirable.

Another object of the invention is to provide means for thus automatically changing the speed of the work-spindle in combination with means for automatically reversing the direction of rotation of said spindle.

To these ends the invention consists primarily in the combination, with the work-spindle, of a driving-shaft, speed-changing mechanism connecting said driving-shaft with said spindle, said speed-changing mechanism embodying a shifting clutch, and means for automatically shifting said clutch to change the speed of the spindle.

The invention further consists in the combination, with the work-spindle, of a driving-shaft, mechanism connecting said driving-shaft with said spindle, said connecting mechanism embodying two shifting clutches, one of said clutches being operative to change the speed of the spindle, and the other clutch being operative to reverse the direction of rotation of the spindle, and means for automatically shifting said clutches.

The invention further consists in the combinations and arrangements of parts hereinafter described and claimed.

Referring to the drawings.

In the drawings the present features of invention are shown as applied to an automatic screw-machine of the general character of the machine shown and described in Letters Patent to Davenport, No. 604,306, May 17, 1898, to which reference may be had for a description of the machine as a whole, the present features of invention relating only to the spindle end of the machine, and to the connection between the driving member and the cam-shaft.

1 is the driving-shaft mounted in bearings 2, 2, to which shaft is connected a single faced pulley 3 for driving the same, said shaft 1 being a constant-speed shaft. Said shaft 1 is connected by change gears 4, 4 to a parallel shaft 5. Loosely mounted upon the shaft 1, so as to revolve freely thereon, is a gear-sleeve 6 provided with two gears 7 and 8 of different diameters. Secured to the hub of the quill-gear 6 is a sprocket-wheel 9.

Mounted to revolve freely on the shaft 5 are two clutch-members 10 and 11. The clutch-member 10 is provided with gear-teeth 12 on its periphery and constitutes also a gear which meshes with the gear 7 of the sleeve 6. Mounted on the hub of the clutch-member 11 is a gear 13 which meshes with the gear 8 of the sleeve 6. Also mounted on the hub of said clutch-member 11 is a sprocket-wheel 14. The clutch-member 11, sprocket-wheel 14, and gear 13 are all rigidly secured together as by a pin 15. Mounted on the shaft 5 between the two clutch-members 10 and 11 is a double clutch-member 16 which is keyed to said shaft so as to revolve therewith, but capable of sliding thereon. The double clutch-member 16 shown in the drawings is a well-known construction and need not be here described in detail.

With this construction it will be seen that the sprocket-wheel 9 is continuously revolved in one direction and that the sprocket-wheel 14 is continuously revolved in the opposite direction. It will be further seen that when the clutch-member 16 is in engagement with the clutch-member 10 the gear 12 on said clutch-member will be the driving-gear and will serve to drive the sleeve 6 and the sprocket-wheel 9 at a speed greater than that of the shaft 5 by reason of the fact that the gear 12 is larger than the gear 7 which it engages. As, however, the gear 8 and the gear 13 are of the same size, it follows that the sprocket-wheel 14 will be given the same speed as the sleeve 6 and consequently the same speed as the sprocket-wheel 9, the speed of both sprocket-wheels 9 and 14 being thus the same and the speed of both sprocket-wheels being greater than that of the shaft 5. When now the clutch 16 is shifted into engagement with the clutch-member 11 the sprocket-wheel 14 will be driven directly thereby and the gear 13 becomes the driving-gear for the sprocket-wheel 9, but as the gears 8 and 13 are of the same size the sleeve 6 and consequently the sprocket-wheel 9 will have the same speed as the sprocket-wheel 14 and the speed of both sprocket-wheels will be that of the shaft 5.

17 is the work-spindle of the machine which, together with its work-holding jaws and feeding devices, may be of any well-known or desired construction. Loosely mounted to revolve on the spindle are two clutch-members 18 and 19. Likewise loosely mounted on the work-spindle 17 are two sprocket-wheels 20 and 21, the sprocket-wheel 20 being connected with the clutch-member 18 and the sprocket-wheel 21 being connected with the clutch-member 19, as shown in the drawings. The clutch-member in each case is mounted on the hub of the sprocket-wheel and is secured thereto by a connecting pin, but any suitable construction may be employed whereby the sprocket-wheel and clutch-member are connected to revolve together. Mounted on the work-spindle 17 between the two clutch-members 18 and 19 is a double clutch-member 22, said clutch-member being keyed to the spindle but capable of sliding thereon. A sprocket-chain 23 connects the sprocket-wheel 9 with the sprocket-wheel 20 and a sprocket-chain 24 connects the sprocket-wheel 14 with the sprocket-wheel 21.

As will be explained more fully hereafter, the clutch 16 is the speed-clutch for changing the speed of the spindle 17, while the clutch 22 is the reversing-clutch for changing the direction of rotation of said spindle.

Means are provided for automatically shifting the two clutches 16 and 22, which means will next be described.

Figure 1:
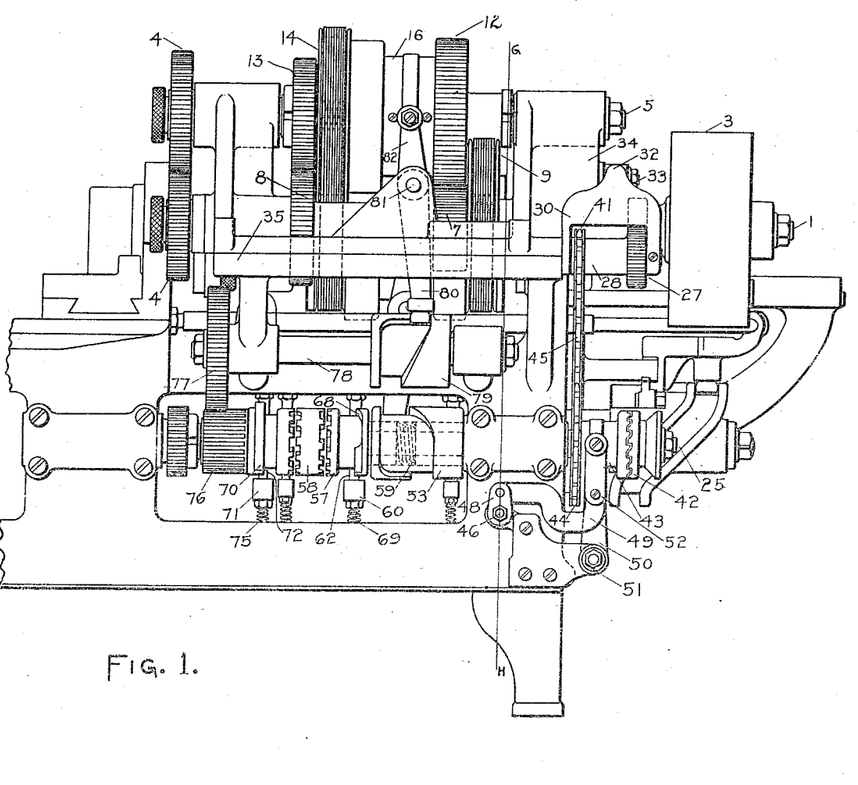
Figure 1 is a rear elevation of the spindle end of an automatic screw machine.

25 is the main cam-shaft of the machine. In the present invention this cam-shaft, instead of being driven by a separate belt and pulley, as has heretofore been customary and as is shown in the Patent No. 604,306 hereinbefore referred to, is driven by a train of mechanism from the constant speed shaft 1. Secured to said shaft 1 is a gear 26 which meshes with a gear 27 secured to a sleeve 28, which sleeve is mounted on a stud 29 carried by an adjustable bracket 30. Said bracket 30 is mounted on one of the bearings 2 or, as shown in the drawings (see Fig. 3), on the bushing 31 secured in said bearing, and so that said bracket is capable of being swung about the shaft 1 as a center. The bracket 30 is provided with an offset 32, as shown in Fig. 1, through which offset passes a set-screw 33, the end of which takes into the supporting bracket 34 and by means of which set-screw the adjustable bracket 30 is clamped in adjusted position. The bracket 34 in which the driving-shaft 1 and its adjuncts are mounted is supported on the frame of the machine in any suitable manner and in the drawings is shown as secured to and supported on a shelf or bracket 35 formed integral with the main frame of the machine.

If desired the pulley 3 may be permanently secured to the shaft 1, but it is preferred, as a convenient means for starting and stopping the machine, to connect the pulley 3 to said shaft by means of a clutch.

Figure 2:
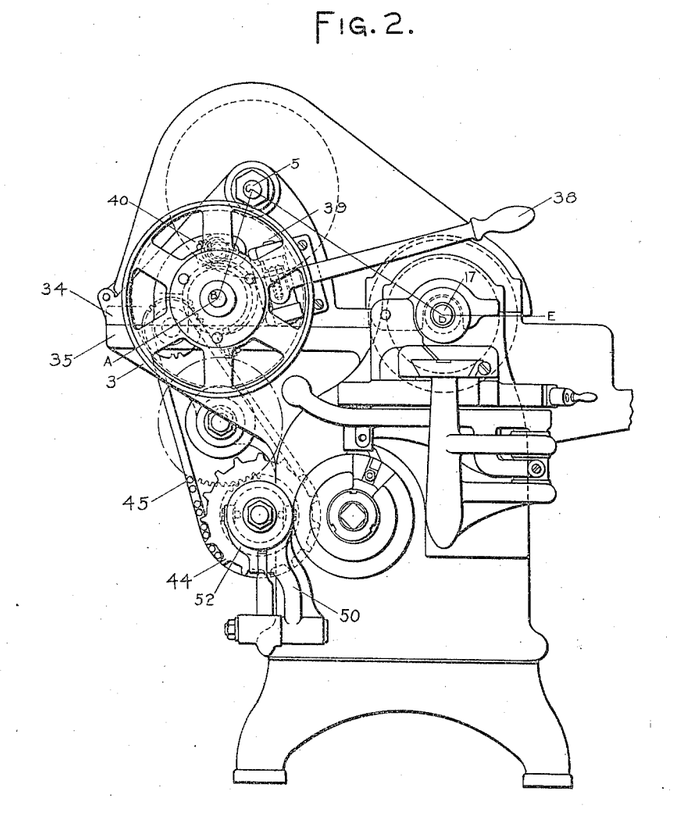
Fig. 2 is an end elevation looking from the right hand end of Fig. 1.
Figure 3:
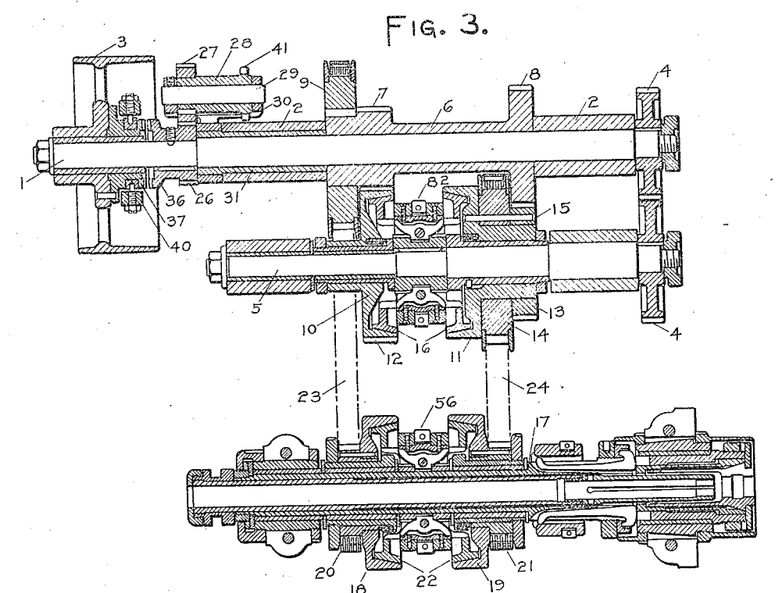
Fig. 3 is a section on the line A—B—C—D—E of Fig. 2.
Figure 4:
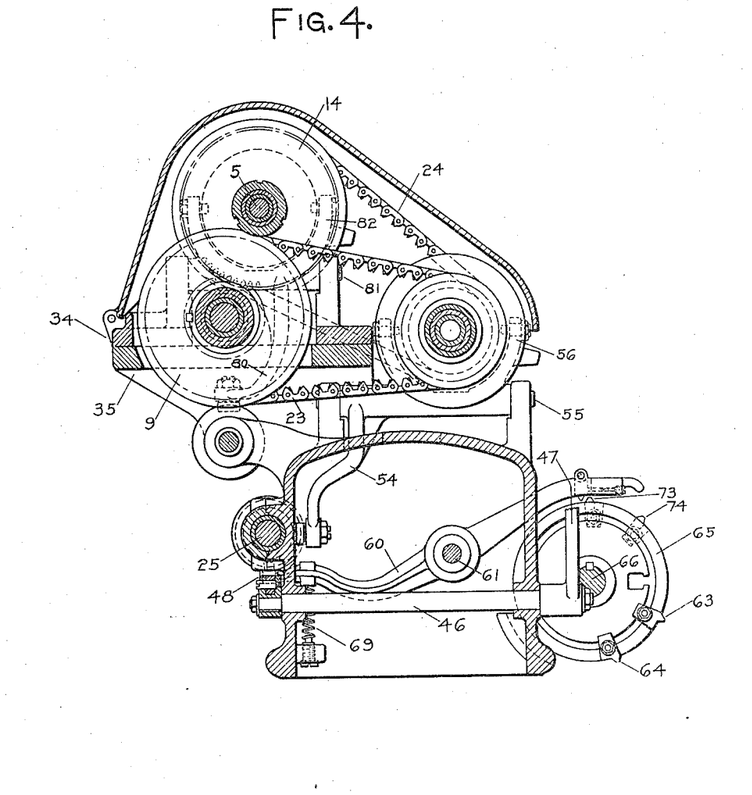
Fig. 4 is a vertical transverse section on the line G—H of Fig. 1 looking from the right in said figure.

As shown in Fig. 3, the hub of the gear 26 is provided with a clutch-member 36 adapted to be engaged by a sliding clutch-member 37 secured to the pulley 3, the pulley 3 and clutch-member 37 sliding together in connecting and disconnecting the clutch. The clutch 37 is adapted to be shifted by means of a hand-lever 38 (see Fig. 2), which lever is pivoted at 39 to the supporting bracket 34, said lever being provided with a fork 40 to engage the sliding clutch-member 37.

Secured to the cam-shaft 25 is a clutch-member 42 adapted to be engaged by a sliding clutch-member 43 loosely mounted on said cam-shaft. Secured to the hub of the clutch-member 43 or formed integral therewith is a sprocket-wheel 44, which is connected by a chain 45 with the sprocket-wheel 41 on the sleeve 28. Any suitable means may be employed for shifting the clutch-member 43. As shown in the drawings, a rock-shaft 46 extends across the machine, said rock-shaft being provided at its forward end with an operating lever 47 and at its rear end with a rock-arm 48. A link 49 connects said rock-arm with the lever 50, which lever is pivoted to the frame at 51 and is provided at its upper end with a fork 52 which engages the clutch-member 43. By the means above described the cam-shaft 25 is connected with the constant speed driving-shaft 1 so as to be operated thereby, while by means of the shifting-clutch referred to said cam-shaft may be at any time disconnected from said constant speed shaft.

The reversing-clutch 22 is operated from the main cam-shaft 25 in the following manner: Loosely mounted on said cam-shaft 25 is a cam 53 adapted to be intermittently rotated by means to be hereafter described, said cam being adapted to operate the clutch-lever 54 carried by the rock-shaft 55 suitably pivoted in the frame, said rock-shaft being also provided with a fork 56 arranged to engage the double clutch-member 22.

Figure 5:
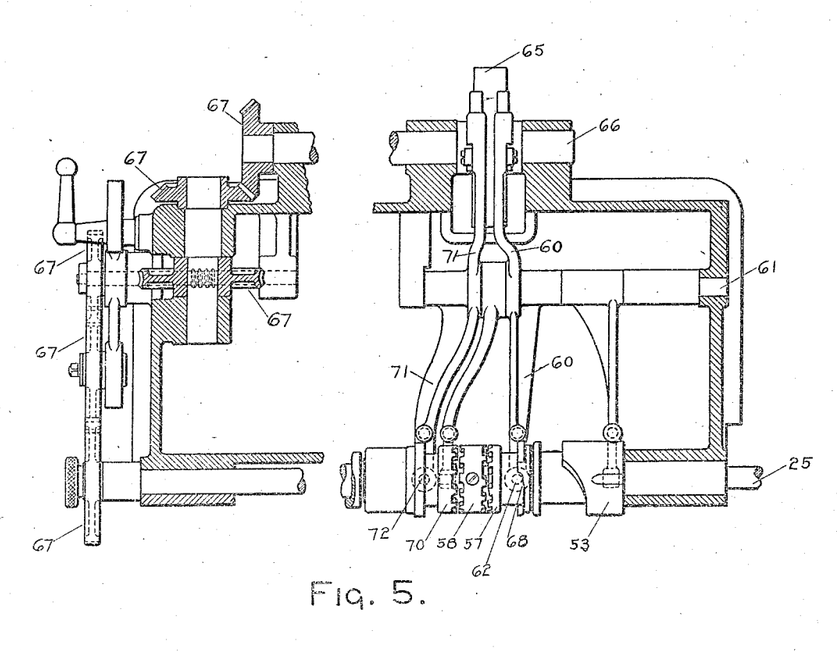
Fig. 5 is a horizontal sectional view taken through the axis of the cam-shaft in Fig. 1.

The means for intermittently operating the cam 53 is as follows: Loosely mounted on the cam-shaft 25 adjacent to the cam 53 is a sliding clutch-member 57 adapted to engage one side of the double clutch-member 58 secured to said shaft 25. The hub of the clutch-member 57 is reduced in diameter and extends within the cam 53, said clutch-member and said cam being keyed one to the other so as to revolve together. A spring 59 is located within the cam 53 with one end of the spring abutting against the inner end of the clutch-member 57 and with its other end abutting against the bottom of the recess in the cam 53, said spring tending to move the clutch-member 57 into engagement with the clutch-member 58 when permitted to do so. The clutch-member 57 is normally latched out of engagement with the clutch-member 58 by means of a latch-lever 60 which extends across the machine and is pivoted on a rod 61. The rear end of the lever 60 is provided with a pin 62 adapted to engage a flanged projection on the clutch-member 57, the parts being so constructed and arranged that when the pin 62 is in engagement with said flanged projection on the clutch-member 57 said clutch-member will be held out of engagement with the clutch-member 58, as shown in Fig. 1. The operation of the latch-lever 60 to release the clutch-member 57 is controlled by tappets or tripping dogs 63 and 64 adjustably mounted on a disk 65 secured to the shaft 66 which extends along the front of the machine and at some suitable point is connected by gears 67 with the cam-shaft 25, as indicated in Fig. 5.

With this construction, as will be seen, whenever the front end of the lever 60 is raised by one of the tripping dogs, say the dog 63, on the disk 65 the rear end of said lever will be depressed and the pin 62 will be withdrawn so as to permit the clutch-member 57 to be thrown by the action of the spring 59 into engagement with the clutch-member 58, and so that said clutch-member 57 and the cam 53 keyed thereto will be rotated. The cam 53 is to be given a half revolution, and means are therefore provided for disengaging the clutch-member 57 when the same has made such half revolution, such means consisting of a cam-surface 68, which, as the clutch-member 57 revolves, will come in contact with the pin 62 on the lever 60, and so that the continued rotation of said clutch-member will cause it to be withdrawn from engagement with the clutch-member 58.

It will be understood that after the lever 60 has been operated by one of the tripping dogs said lever will be immediately returned to its normal position by its springs 69, and so that the pin 62 will be brought into the path of the cam-surface 68. The half revolution of the cam 53 thus provided will serve to shift the clutch 22 and thus reverse the direction of rotation of the spindle 17. The shifting of said clutch 22 in the opposite direction is effected in the same manner as before, by the action of the other tripping dog 64 on the lever 60. It will be understood that the clutch-member will be withdrawn from engagement at the end of each half revolution. By properly adjusting the tripping dogs 63, 64, on the disk 65 the times of the shifting of the clutch 22 and the automatic reversal of the spindle may be varied as desired, it being understood that the disk 65 is continuously rotated so long as the cam-shaft rotates.

The automatic operation of the speed-clutch 16 for changing the speed of the spindle and the means for effecting the same will next be described. Loosely mounted on the cam-shaft on the opposite side of the clutch-member 58 is another sliding clutch-member 70 adapted to engage said clutch-member 58. A second lever 71 provided with a projecting pin 72 extends across the machine with its front end arranged to be engaged by tappets or tripping dogs 73 and 74 adjustably mounted on the opposite side of the disk 65. The pin 72 is arranged to engage a similar flanged projection on the clutch-member 70 and said clutch-member is likewise provided with a cam-surface for withdrawing said clutch-member from engagement with the clutch-member 58, but this clutch-member 70 is designed to make one complete revolution before being thrown out and consequently said cam-surface does not appear in the drawings. It will be understood, however, that the throwing out of said clutch-member 70 is effected by the engagement of said cam-surface with the pin 72 when the lever 71 has been returned to its normal position by the action of its spring 75. Secured to or forming a part of the clutch-member 70 is a gear 76 which engages a gear 77 secured to a short shaft 78 mounted in suitable bearings in the frame. Secured to the shaft 78 is a cam 79 adapted to engage the clutch-lever 80 pivoted at 81 and provided with a fork 82 arranged to engage the double clutch-member 16 of the speed clutch. The gear 77 is twice the size of the gear 76 and so that a complete revolution of the clutch-member 70 and the gear 76 will give only a half revolution to the gear 77 and the cam 79. By properly adjusting the tripping dogs 73 and 74 on the disk 65 the times when the clutch 16 is shifted and the speed of the spindle thereby changed may be varied as desired.

The operation of the mechanism above described is as follows: It has already been pointed out that the sprocket-wheel 9 revolves continuously in one direction and that the sprocket-wheel 14 revolves continuously in the opposite direction, and it will be understood that the sprocket-wheel 14 through the connecting chain 24 is employed to drive said spindle in the reverse direction. It has also been explained how the shifting of the clutch 16 will serve to give to the sprocket-wheels 9 and 14 either a fast speed or a slow speed and that the speed of each sprocket-wheel is always the same as that of the other, and so that with the speed-clutch 16 in one position both sprocket-wheels will have the fast speed and with said clutch in the other position both sprocket-wheels will have the slow speed. It will be seen, therefore, that the spindle 17 will be revolved at two different speeds according to whether the clutch 16 is in engagement with the clutch-member 10 or with the clutch-member 11, and that in the operation of the machine the speed of the spindle will be automatically changed from the fast speed to the slow speed, and vice versa.

It will be further seen that by the shifting of the reversing-clutch 22 the direction of rotation of the spindle will be changed and that with the speed clutch 16 remaining in the same position the reverse rotation of the spindle will be at the same speed as its rotation in the forward direction. If, however, the speed-clutch be also shifted, then the result will be that the spindle will be rotated in the forward direction at one speed and will then be rotated in the reverse direction at a different speed. Thus, assuming the machine to be cutting a thread on the rod of stock by means of a die, the die may be run on to the rod to cut the thread at a slow speed and the die then run off of the rod by reversing the rotation of the spindle and at a faster speed than it was run on.

The clutch-members 18 and 19 of the reversing-clutch will always be rotated in opposite directions and when the speed of one of these clutch-members is changed the speed of the other clutch-member will be correspondingly changed, and so that as long as the speed-clutch 16 remains unshifted a shifting of the reversing-clutch 22 will serve merely to reverse the direction of rotation of the spindle, but without changing the speed of its rotation.

It will be seen that with the arrangement described two different speeds may be given to the work-spindle in either direction, and that the change from one speed to the other, as well as the change in direction of rotation of the spindle, may be automatically effected, and that all that is required in order to automatically produce any or all of these results is merely to employ the requisite tripping dogs and to properly adjust the same on the disk 65.

It will be further seen that the entire machine is driven by a single belt and driving-shaft, which driving-shaft has a constant speed, and further that by reason of the fact that the main cam-shaft is connected with this constant speed driving-shaft by a train of mechanism which is separate from the train of mechanism which connects said driving-shaft with the spindle, the speed of the spindle may be changed without in any way affecting the speed of the cam-shaft.

While two speeds of the spindle are thus provided for in the automatic operation of the machine, which two speeds are in accordance with the ratio between the gear 7 and the gear 12, other speeds of the spindle may be provided for by changing the change-gears 4, 4, it being understood, however, that whatever the relative size of the change-gears employed may be, the ratio of the two automatic speeds of the spindle will remain the same, being determined by the size of the gears 7 and 12, as above stated.

As will be seen, the shaft 25 referred to in this specification as the cam-shaft or the main cam-shaft is the shaft which controls the operating parts of the machine other than the work-spindle, and it will be understood that the cam-shaft referred to in certain of the claims is this controlling shaft. It will be further understood that said cam-shaft 25 corresponds to the cam-shaft 26 in the Patent No. 604,306, hereinbefore referred to, and that the connections from said cam-shaft to the tool-slide and to the other operating parts of the machine may be the same as shown in said patent.

What I claim as my invention and desire to secure by Letters Patent is:

1. The combination, with the work-spindle, of means embodying two driving members and an intermediate shifting clutch through which said spindle is rotated at two different speeds, and a continuously rotating shaft and devices thereon for automatically controlling the shifting of said clutch.

2. The combination, with the work-spindle, of means embodying a shifting clutch through which said spindle is rotated at two different speeds, and a continuously rotating shaft and adjustable devices thereon for automatically controlling the shifting of said clutch.

3. The combination, with the work-spindle, of means embodying a shifting clutch through which said spindle is rotated at two different speeds, a continuously rotating shaft, a disk carried thereby and adjustable dogs on said disk for automatically controlling the shifting of said clutch.

4. The combination, with the work-spindle, of means for rotating said spindle at two different speeds in either direction, and means for automatically changing either the speed or direction of said spindle.

5. The combination, with the work-spindle, of means for automatically changing the speed of rotation of said spindle, and means for automatically reversing said spindle without changing its speed.

6. The combination, with the work-spindle, of means for automatically reversing said spindle without changing its speed, means for rotating said spindle at two different speeds in either direction, and means for automatically changing from one speed to the other.

7. The combination, with the work-spindle, of a driving shaft, speed changing means connecting said driving shaft and said spindle, and means for automatically reversing said spindle without changing its speed.

8. The combination, with the work-spindle, of a driving shaft, means for automatically reversing said spindle without changing its speed, and means for automatically giving to said spindle either of two speeds in either direction.

9. The combination, with the work-spindle, of two driving members for said spindle, means for rotating said driving members in opposite directions at the same speed, means for simultaneously and automatically changing the speed of both said driving members, and means for automatically connecting one or the other of said driving members with the spindle.

10. The combination, with the work-spindle, of two driving members for said spindle, means for rotating said driving members in opposite directions at the same speed, means embodying a shifting clutch for simultaneously and automatically changing the speed of both said driving members, and a shifting clutch for connecting one or the other of said driving members with the spindle.

11. The combination, with the work-spindle, of two driving members for said spindle, means for rotating said driving members in opposite directions at the same speed, means embodying a shifting clutch for simultaneously changing the speed of both said driving members, a shifting clutch for connecting one or the other of said driving members with the spindle, and means for automatically shifting said clutches.

12. The combination, with the work-spindle, of a driving shaft, speed changing mechanism embodying two driving members and an intermediate shifting clutch connecting said driving shaft and said spindle, and a continuously rotating shaft provided with devices for automatically controlling the shifting of said clutch.

13. The combination, with the work-spindle, of a driving shaft, connections between said driving shaft and said spindle embodying speed changing mechanism and reversing mechanism, and a continuously rotating shaft and devices thereon for automatically effecting a change in the speed of the spindle and for automatically effecting a reversal of the spindle.

14. The combination, with the work-spindle, of a driving shaft, mechanism connecting said driving shaft and said spindle, said connecting mechanism embodying two clutches, one for changing the speed of the spindle and the other for reversing said spindle, and a continuously rotating shaft and devices thereon for automatically controlling the shifting of said clutches.

15. The combination, with the work-spindle, of a driving shaft, mechanism connecting said driving shaft and said spindle, said mechanism embodying two clutches, one for changing the speed of said spindle and the other for reversing said spindle, and a continuously rotating shaft and adjustable devices thereon for automatically controlling the shifting of said clutches.

16. The combination, with the work-spindle, of a driving shaft, mechanism connecting said driving shaft and said spindle, said mechanism embodying two clutches, one for changing the speed of the spindle, and the other for reversing said spindle, and means for automatically controlling the shifting of either one of said clutches independent of the other.

17. The combination, with the work-spindle, of a driving shaft, mechanism connecting said shaft and said spindle, said mechanism embodying two clutches, one for changing the speed of the spindle and the other for reversing said spindle, and a shaft and devices thereon for automatically controlling the shifting of either one of said clutches independent of the other.

18. The combination, with the work-spindle and the cam-shaft, of a driving shaft, mechanism connecting said driving shaft with said spindle, mechanism connecting said driving shaft with said cam-shaft, a clutch connecting said driving shaft with a primary driver, and means for disconnecting said clutch and thereby stopping both said spindle and said cam-shaft.

19. The combination, with the work-spindle and the cam-shaft, of a driving shaft, mechanism connecting said driving shaft with said spindle, mechanism connecting said driving shaft with said cam-shaft, and means for disconnecting said last mentioned mechanism and thereby stopping said cam-shaft without stopping said spindle.

20. The combination, with the work-spindle and the cam-shaft, of a primary driver, a driving shaft, a clutch connecting said primary driver and said driving shaft, mechanism connecting said driving shaft and said spindle, mechanism connecting said driving-shaft and said cam-shaft, and means for disconnecting said last mentioned mechanism.

21. The combination, with the work-spindle, of a driving member, mechanism connecting said driving member to said spindle, said mechanism embodying means for rotating said spindle at different speeds, a cam-shaft and mechanism connecting said driving member to said cam-shaft.

22. The combination, with the work-spindle, of a driving member, mechanism connecting said driving member to said spindle, said mechanism embodying means for rotating said spindle at different speeds in one direction, means for reversing the rotation of said spindle, a cam-shaft and mechanism connecting said driving member to said cam-shaft.

23. The combination, with the work-spindle, of a driving member, mechanism connecting said driving member to said spindle, said mechanism embodying means for rotating said spindle at different speeds in one direction, means for automatically changing from one speed to the other, means for automatically reversing the rotation of said spindle, a cam-shaft and mechanism connecting said driving member to said cam-shaft.

CHARLES A. RICH.

Witnesses:
  W. H. THURSTON,
  J. H. THURSTON.